United States Patent
Inapakolla et al.

(10) Patent No.: US 8,526,923 B2
(45) Date of Patent: *Sep. 3, 2013

(54) ENABLING A USER TO PURCHASE A RING BACK TONE

(75) Inventors: Verra V. Inapakolla, Jersey City, NJ (US); Madhu Bharathula, Somerset, NJ (US); Shankar Kulkarni, Bridgewater, NJ (US); Venkat Gaddam, Bridgewater, NJ (US)

(73) Assignee: Cellco Partnership, Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/585,572

(22) Filed: Aug. 14, 2012

(65) Prior Publication Data

US 2012/0309369 A1    Dec. 6, 2012

Related U.S. Application Data

(63) Continuation of application No. 12/603,128, filed on Oct. 21, 2009, now Pat. No. 8,280,356.

(51) Int. Cl.
*H04M 3/42* (2006.01)
*H04M 3/00* (2006.01)
*H04W 4/00* (2009.01)

(52) U.S. Cl.
USPC ............... 455/414.1; 455/466; 379/201.02; 379/418

(58) Field of Classification Search
USPC ............ 455/414.1, 466, 415; 379/201.02, 379/201.07, 201.08, 207.02, 207.16, 418
See application file for complete search history.

(56) References Cited

U.S. PATENT DOCUMENTS

| 2005/0207555 | A1* | 9/2005 | Lee et al. | 379/207.16 |
| 2006/0109968 | A1* | 5/2006 | Hahm et al. | 379/207.16 |
| 2006/0109970 | A1* | 5/2006 | Shim et al. | 379/207.16 |
| 2006/0264225 | A1* | 11/2006 | No et al. | 455/458 |
| 2007/0003047 | A1* | 1/2007 | Batni et al. | 379/215.01 |
| 2007/0189488 | A1* | 8/2007 | Stoops | 379/207.16 |
| 2007/0218877 | A1* | 9/2007 | Mills | 455/414.1 |

(Continued)

FOREIGN PATENT DOCUMENTS

| KR | 10-2006-0068155 | 6/2006 |
| WO | WO-2005/051015 A1 | 6/2005 |

OTHER PUBLICATIONS

European Search Report issued in European Patent Application No. EP 10 01 3822, dated Dec. 8, 2010.

(Continued)

*Primary Examiner* — Christopher M Brandt (57) ABSTRACT

Methods and systems are provided for enabling users of mobile devices to purchase Ring Back Tones ("RBTs"). The system enables an offer message, offering for purchase an RBT and including a reply-to telephone number, to be generated and sent to a mobile device. In response to the offer message, a reply message sent from the mobile device to the reply-to telephone number of the offer message is received. A code is extracted from the reply-to telephone number to which the received reply message was sent. A particular RBT associated with the code extracted from the telephone number is identified in a table storing a plurality of codes each associated with a corresponding RBT. A user of the mobile device is determined to desire to purchase the particular RBT associated with the code in the table.

21 Claims, 8 Drawing Sheets

(56) References Cited

U.S. PATENT DOCUMENTS

| | | | |
|---|---|---|---|
| 2007/0286401 A1* | 12/2007 | Siddiqui et al. | 379/372 |
| 2007/0286402 A1* | 12/2007 | Jacobson | 379/372 |
| 2007/0291931 A1* | 12/2007 | DeMent | 379/418 |
| 2008/0063168 A1* | 3/2008 | Haley et al. | 379/201.01 |
| 2008/0096535 A1* | 4/2008 | Kim | 455/414.1 |
| 2008/0123830 A1* | 5/2008 | Shah et al. | 379/201.01 |
| 2008/0130841 A1* | 6/2008 | Pan et al. | 379/87 |
| 2008/0292068 A1* | 11/2008 | Bernhard | 379/87 |
| 2009/0028301 A1* | 1/2009 | Ma et al. | 379/87 |
| 2009/0214003 A1* | 8/2009 | Yan | 379/87 |

OTHER PUBLICATIONS

Entire Prosecution of U.S. Appl. No. 12/603,128 to Inapakolla et al., on Oct. 21, 2009, entitled, "Enabling a User to Purchase a Ring Back Tone."

* cited by examiner

100

| SCM MAPPING | |
|---|---|
| RBT CONTENT ID | MAP ID |
| 12340001 | 000 |
| 34560003 | 001 |
| 54632341 | 002 |
| 89721290 | 003 |
| 64328901 | 004 |

| CCES MAPPING | |
|---|---|
| MAP ID | LONG CODE |
| 000 | 900070005000 |
| 001 | 900070005001 |
| 002 | 900070005002 |
| 003 | 900070005003 |
| 004 | 900070005004 |

ENABLING A USER TO PURCHASE A RING BACK TONE

CROSS-REFERENCE TO RELATED APPLICATION

This application is a continuation of and claims priority from U.S. application Ser. No. 12/603,128, filed on Oct. 21, 2009, the disclosure of which is hereby incorporated by reference herein in its entirety.

BACKGROUND

The Ring Back Tone ("RBT") tagging service provides a subscriber of a mobile service provider (e.g., Verizon Wireless™) with means to discover the service and easily purchase RBT by leveraging the existing RBTs. When a customer places a call to another customer with the RBT tagging service feature enabled, a system generated Short Message Service ("SMS") purchase offer message will be sent to the caller's handset with the information about the RBT that the caller heard. The information about the RBT may include the song title and the artist's name and the RBT numeric identification code.

For example, the SMS message may include "you just heard 'Kid Rock/All Summer Long' Ring Back Tone. Reply with '54632341' to purchase or with 'opt out' to opt out of the RBT notification messages." In this scenario, if the customer wishes to purchase that RBT, the customer has to reply with the code mentioned in the SMS. Alternatively, the customer may respond back with the artist's name and song title to purchase the RBT. In either case, to purchase the RBT, the customer has to (i) recall the numeric identification code or artist name and song title for identifying the RBT and (ii) type in the numeric identification code or artist name and song title with the risk of inaccurate keypad typing entry. Therefore, this approach may result in unsuccessful RBT purchases and poor customer experience.

Hence there is a need for a method that makes the process of purchasing RBTs easier for the customer by enabling the customer to purchase RBTs without having to enter the RBT numeric identification code or the artist name and the song title.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

In the following detailed description, numerous specific details are set forth by way of examples in order to provide a thorough understanding of the relevant teachings. However, the present teachings may be practiced without such details. In other instances, well known methods, procedures, components, and/or circuitry have been described at a relatively high-level, without detail, in order to avoid unnecessarily obscuring aspects of the present teachings.

The various technologies disclosed herein relate a method for enabling a user of a mobile device to more easily purchase an RBT that the user has heard as a result of a call to another device. When, for example, a Verizon Wireless™ customer makes a call to another Verizon Wireless™ customer, the calling customer listens to the RBT played by the called customer. During this process, Calling Data Records ("CDR") associated with the call are captured by the mobile service provider network. The CDR associated with the call may include information about the content of the call, its duration, the RBT played during the call, etc. The RBT played portion of the CDR may include the artist name, the title of the song, and the RBT content identification code associated with the RBT heard by the calling customer.

The RBT played portion of the CDR are extracted and sent to a Service Creation and Management ("SCM") server. The SCM enables rapid introduction of premium data products to manage third party content, applications and services for the subscribers of the mobile service provider. These content, for example, include Wireless Application Protocol ("WAP") 2.0, videos, games, ringtones, messages, images, audios, and voting.

Figure 1:
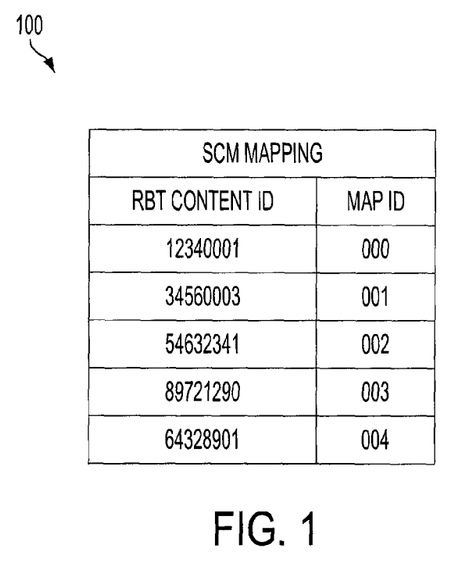
FIG. 1 illustrates an exemplary table that shows the mapping between the mapping identification code and the RBT content identification code.

For RBT sales, the SCM receives the CDR and creates a table mapping the RBT content identification code with an available mapping identification code. FIG. 1 illustrates an exemplary table 100 that illustrates such mapping between the mapping identification code and the RBT content identification code. Once the mapping is accomplished, SCM initiates an SMS request to a Customer Communication Enterprise Services ("CCES") server. The CCES generally facilitates the sending of text messages, e-mails, letters, and fax notifications on behalf of the carrier to the carrier's customers.

In response to the SMS request from SCM, CCES creates an SMS message to the calling customer offering the calling customer to purchase the RBT played during the call. The SMS message may include an artist name and a song title associated with the RBT played during the call. The CCES may receive this information from SCM as a part of the SMS request initiated by SCM. Alternatively, CCES may request this information after receiving the SMS request from SCM.

Before sending the SMS message to the customer, CCES creates a reply-to-number in a form of a long code. The long code includes the mapping identification code. In one example, the mapping identification code may be incorporated as part of the least three significant digits of the long code. For one example, the long code includes 900070005xxx, where "xxx" correspond to the mapping identification code. When CCES receives the SMS request from SCM, it will extract the mapping identification code ranging from 000-999 and will append the mapping identification code to the long code.

Figure 2:
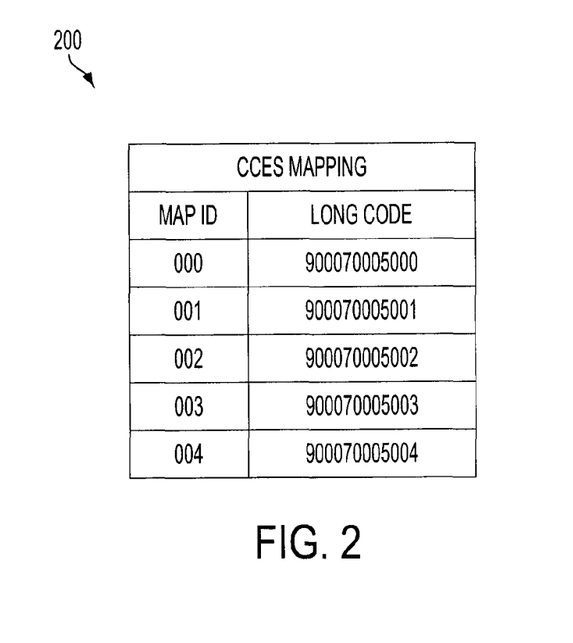
FIG. 2 illustrates an exemplary table that shows a plurality of long codes along with their associative mapping identification codes.

The CCES will then include the long code as a reply-to-number in the SMS message to be sent to the customer and sends the message to the customer. The customer response generates another message back to the long code reply-to-number. FIG. 2 illustrates an exemplary table 200 that shows a plurality of long codes along with their associative mapping identification codes. Based on the above logics if the customer hears 100 RBTs, CCES will be generating 100 SMS messages with 100 different reply-to-numbers.

Figure 3:
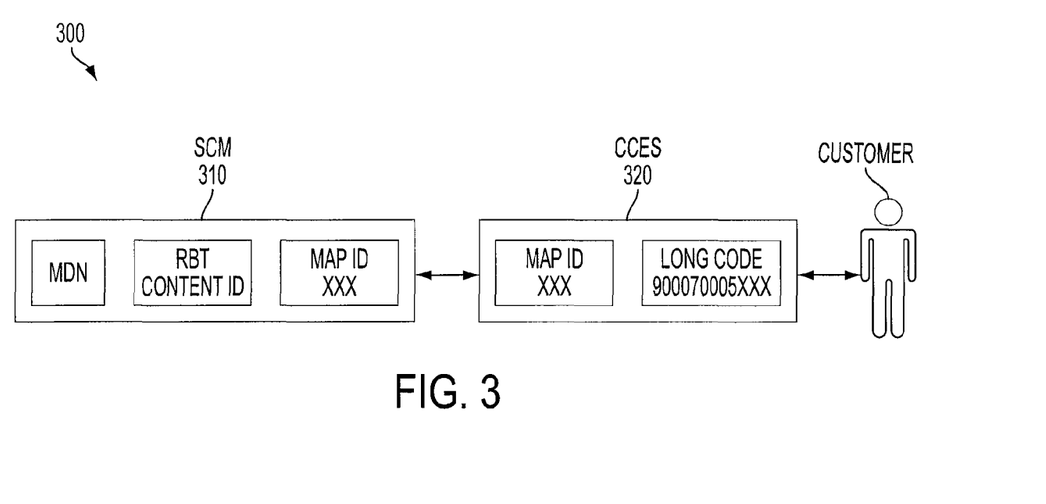
FIG. 3 illustrates an exemplary content that flows between a Service Creation and Management, a Customer Communication Enterprise Services, and the customer.

FIG. 3 illustrates an exemplary content 300 that flows between SCM, CCES, and the customer. The exemplary content 300 includes SMS request 310 from SCM. The SMS request 310 includes the MDN, the RBT content identification code, and the mapping identification code. The CCES uses the RBT content identification code to identify the artist name and the song title. The CCES generates a text message that identifies the artist and the song title. Before sending the SMS message to the customer, CCES creates a reply-to-number in a form of a long code. To do so, CCES uses the mapping identification code, which may be incorporated as part of the least three significant digits of the long code. The CCES forwards the generated text message to the caller.

With this approach, in lieu of entering the numeric code, the caller can simply reply back to the SMS message with "Y" or "Yes" to purchase and "X" or "Optout" to opt out from the RBT purchase offer messages. Based on the caller's response, the appropriate action will be taken within the internal mobile service provider network applications. To illustrate, if the caller chooses to purchase the RBT, CCES receives the "Y" or "Yes" response, extracts the mapping identification code from the reply-to-number, and forwards the mapping identification code along with the MDN to SCM. The SCM determines the RBT content identification code based on the mapping identification code and purchases for the caller the RBT corresponding to the RBT content identification code. If, however, the caller chooses to not purchase the RBT and instead opt-out from receiving the RBT messages in the future, CCES receives the "X" or "Optout" response and forwards the response along with the MDN to SCM. SCM updates the account for the caller to reflect that the user wishes not to receive RBT purchase offers in the future. Once the caller has opted out from the RBT tagging messages, he can reactivate to receive these messages at anytime in the future by logging into caller's account and making changes thereto.

By CCES solution of associating a mapping identification code to the RBT content identification code and appending the mapping identification code to the reply-to-number, CCES can identify the RBT content identification code without having to receive it from the caller. That is, CCES can internally extract the mapping identification code from the reply-to-number and identify the RBT based on the mapping identification code. Therefore, the caller is relieved of the task of physically entering the RBT identification codes. This eliminates keypad entry errors in the purchase offer response SMS and provides a more positive, friendly user experience. The result is a potential increase in RBT purchase revenue.

With this overview, a more detailed illustration of RBT purchase offer process and interaction among different servers of the mobile service provider network will be described below with respect to FIGS. 4-6.

Figure 4:
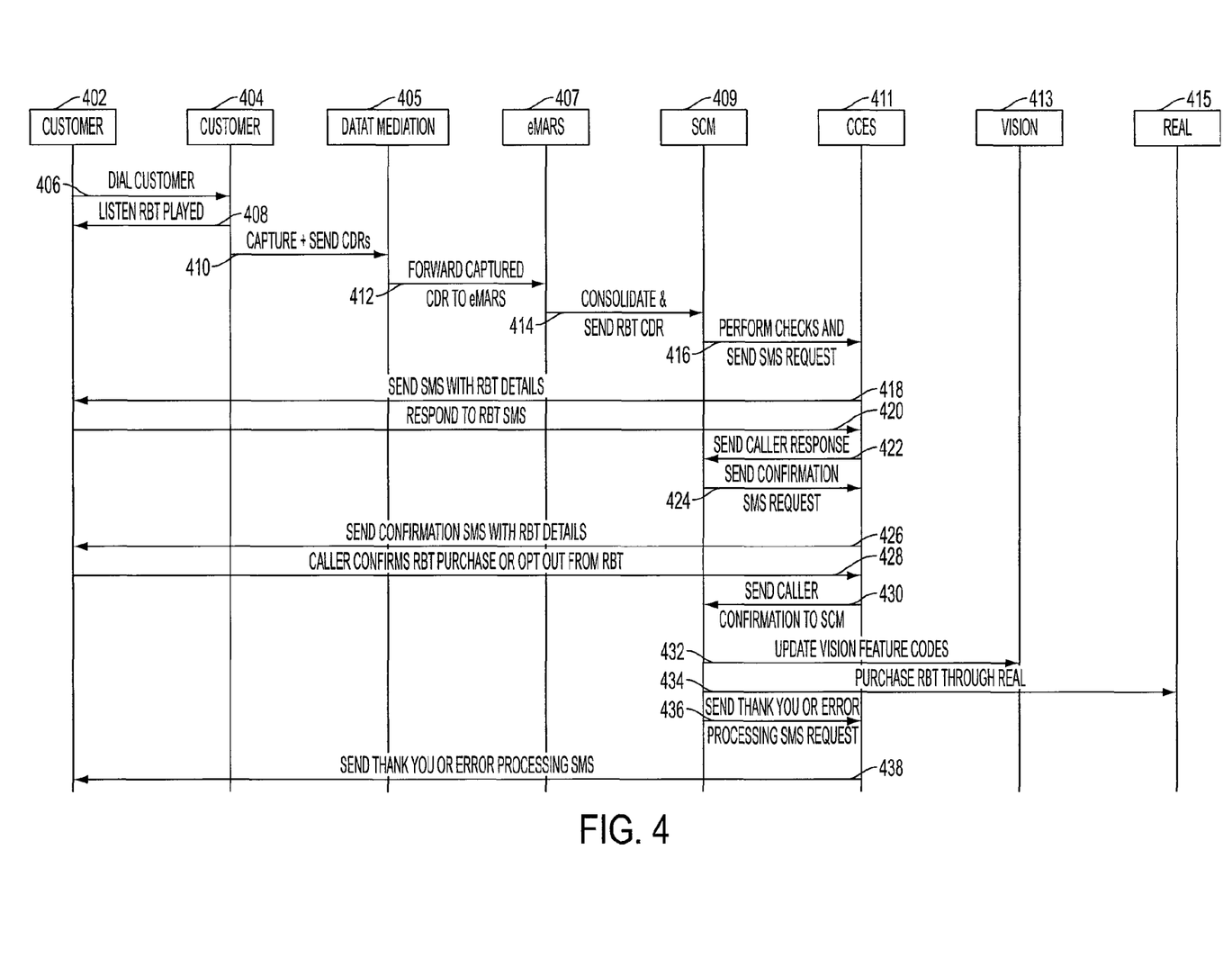
FIG. 4 illustrates an exemplary RBT purchase offer process to enable a caller to purchase an RBT.

FIG. 4 illustrates an exemplary RBT purchase offer process 400 to enable a caller to purchase an RBT. The process 400 begins with one customer 402 placing a call to another customer 404 of the mobile service provider network (406). The calling customer listens to the RBT played by the called customer (408). The RBT may include a special music that is being heard by the calling customer as a result of a call to the called customer and that is different from a normal ring of the called customer. During the call, the CDRs are captured by the by the network switches associated with the call, and after the call the CDRs are forwarded to a Data Mediation server 405 (410).

The Data Mediation server 405 provides support for network voice CDR and IP data mediation software systems. The Data Mediation business function involves the collection, correlation, storage, and forwarding of voice CDR and IP data usage records from the source network elements and the timely transfer of these records to other business applications within the network. In one example, Data Mediation server 405 forwards the captured voice CDR to an Enhanced Media Resource Server ("eMARS") 407 (412). The eMARS 407 is used to verify whether a subscriber (e.g., the caller) is provisioned and authorized to receive the RBT tagging service. If so, eMARS 407 consolidates RBT CDRs for the call and sends them to SCM 409 (414).

The SCM 409 performs validation and initiates an SMS request to CCES 411 (416). When SCM 409 receives CDR from eMARS, it does basic validation on the data and creates mapping between the RBT content identification code and the next available mapping identification code as shown in FIG. 1, for example. The validation process may include determining whether the RBT has already been purchased by the caller or whether the caller has previously opted out from the RBT purchase offers. If either of these scenarios is true, SCM 409 does not initiate an SMS message request to CCES 411. Otherwise, SCM 409 initiates an SMS message request to CCES 411. The SMS message request is designed to trigger CCES 411 to generate a purchase offer SMS for the particular RBT heard by the caller.

The CCES 411 processes the request and prepares the purchase offer SMS. The CCES 411 generally facilitates the sending of text messages, e-mails, letters, and fax notifications to the customer. For RBT tagging, CCES 411 maintains the caller's reply-to-number also called a long code. The long codes include the mapping identification code. When CCES 411 receives SMS request from SCM 409, it will extract the mapping identification code ranging from 000-999 and append the mapping identification code to the long code. The CCES 411 generates a purchase offer SMS that describes the details of the RBT (e.g., artist name and song title) and that includes the long code (including the mapping identification code) as the reply-to-number. The CCES 411 then forwards the purchase offer SMS to customer 402 (418). The purchase offer SMS may be routed through a messaging gateway (not shown) to the customer 402. The messaging gateway provides a service of transforming text messages to mobile network traffic.

The customer 402 receives the purchase offer and selects to either purchase the RBT or to opt out from receiving future RBT purchase offers. The customer 402 formulates this response in a reply text message and sends the reply text message to the reply-to-number appearing in the purchase offer SMS (420), i.e. to the particular long code. The customer 402 may either reply with "Y" or "Yes" to purchase the RBT or with "X" or "Optout" to opt out from receiving future RBT purchase offers.

The CCES 411 receives customer 402 response, logs it and forwards the response to SCM 409 (422). To illustrate, if customer 402 chooses to purchase the RBT, CCES 411 receives the "Y" or "Yes" response as the case may be, extracts the mapping identification code from the reply-to-number, and forwards the mapping identification along with the MDN to SCM 409. Alternatively, instead of extracting the mapping identification code from the reply-to-number, CCES 411 may use the exemplary table 200 shown in FIG. 2 to identify the mapping identification code. To this end, CCES 411 references table 200 to identify mapping identification code associated with the reply-to-number (e.g., the long code). The SCM 409 determines the RBT content identification code based on the mapping identification code and purchases for the caller the RBT corresponding to the RBT content identification code. If, however, customer 402 chooses to not purchase the RBT and instead opt-out from receiving future RBT purchase offers, CCES 411 receives the "X" or "Optout" response as the case may be and forwards the response along with the MDN to SCM 409.

The SCM 409 may initiate a confirmation SMS request to CCES 411 (424). This request is to double check with customer 402 that customer 402 has indeed selected to purchase the RBT or opt out from receiving future RBT purchase offers as the case may be. The CCES 411 sends confirmation solicitation SMS to customer 402 (426). In response, customer 402 confirms RBT purchase or opt out from receiving future RBT messages (428).

The CCES 411 receives customer 402 response, again logs it and forwards it to SCM 409 (430). The SCM 409 reviews the response and updates the Virtual Information System Integrated Online Network ("VISION") server 413 accordingly (432). In one implementation, VISION 413 is the main billing system used to house customer information and make changes to a customer's service profile. For example, if customer 402 selects to purchase the RBT, SCM 409 updates VISION 413 to reflect that customer 402 has purchased the RBT. Alternatively, if customer 402 selects to opt out from receiving future RBT purchase offers, SCM 409 updates VISION 413 to reflect that customer 402 has selected to opt out from receiving future RBT purchase offers. Once customer 402 has opted out from receiving RBT purchase offers, he can reactivate to receive these messages at anytime in the future by logging into his account and making changes thereto.

Assuming that customer 402 has selected to purchase the RBT, SCM 409 may make the purchase through RealNetwork ("REAL") server 415 (434). REAL 415 is a U.S. based software and service provider of internet media delivery software. One of the services of REAL 415 includes Rhapsody®, which is a subscription-based online entertainment service. SCM 409 may make the purchase through any other software and service provider in addition to or instead of REAL 415.

Upon successful purchase, SCM 409 initiates an SMS request to CCES 411 for thank you message to be sent to customer 402 (436). In response, CCES 411 sends a thank you SMS to customer 402 (438). In one implementation, customer 402 can purchase RBTs up to a given threshold, for example, 100 RBTs. Once the threshold is reached, SCM 409 sends a request to CCES 411 to send an SMS notifying customer 402 that the maximum allowance has been reached. The customer 402 then has the option to remove one or more purchased RBTs to fall below the threshold enabling the capacity to purchase future RBTs. The previously purchased RBTs may be removed by customer 402 using the Media Store web application, for example. The Media Store is a Verizon Wireless™ online web service offering the purchase and self management of entertainment based mp3 audio files.

Figure 5:
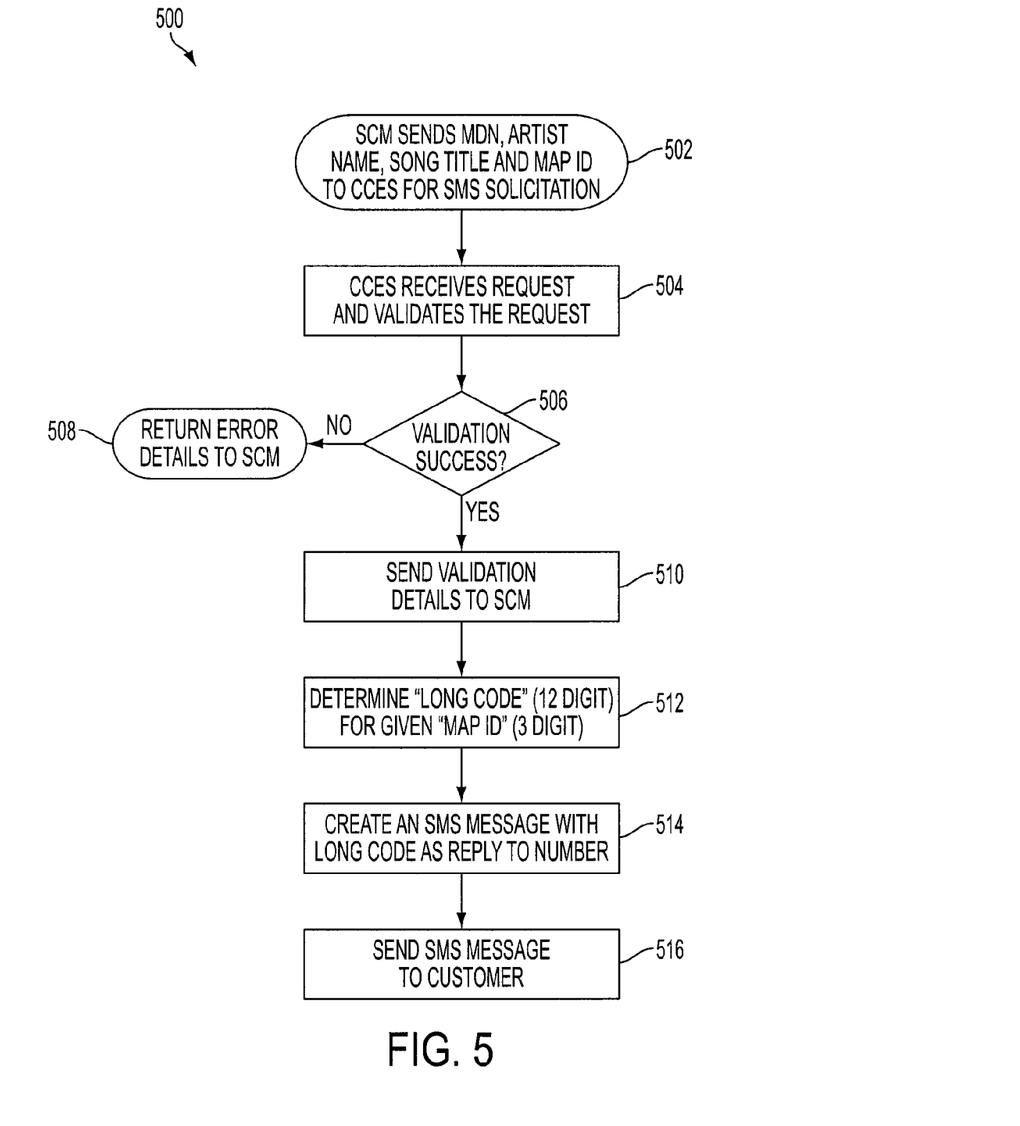
FIG. 5 illustrates an exemplary process for creating an RBT purchase offer.

FIG. 5 illustrates an exemplary process 500 for creating an RBT purchase offer. The process 500 begins with SCM 409 sending MDN, artist name, song title and mapping identification code to CCES 411 for SMS solicitation (502). The CCES 411 receives the SMS request and validates the request (504). In one example, CCES 411 ensures that the request includes the MDN, the mapping identification code, and information about the RBT. If not, CCES 411 returns an error message to SCM 409, detailing the problem (506, 508). If the validation is successful, CCES 411 sends validation details to SCM 409 (506, 510).

Thereafter, CCES 411 determines a long code for the given mapping identification code (512). When CCES 411 receives the SMS request from SCM 409, it will extract the mapping identification code ranging from 000-999 and append the mapping identification code to the long code. The long code now including the appended mapping identification code will then be used as a reply-to-number by CCES 411 to send an SMS message to the customer. In one example, as noted above, the mapping identification code may be incorporated as part of the least three significant digits of the long code. For one example, the long code includes 900070005xxx, where "xxx" correspond to the mapping identification code.

The CCES 411 creates an SMS message with the long code as the reply-to-number (514). The message includes information about the RBT. For example, the message includes an artist name, a song title and/or price information. The CCES 411 then forwards the message to the customer (516).

Figure 6:
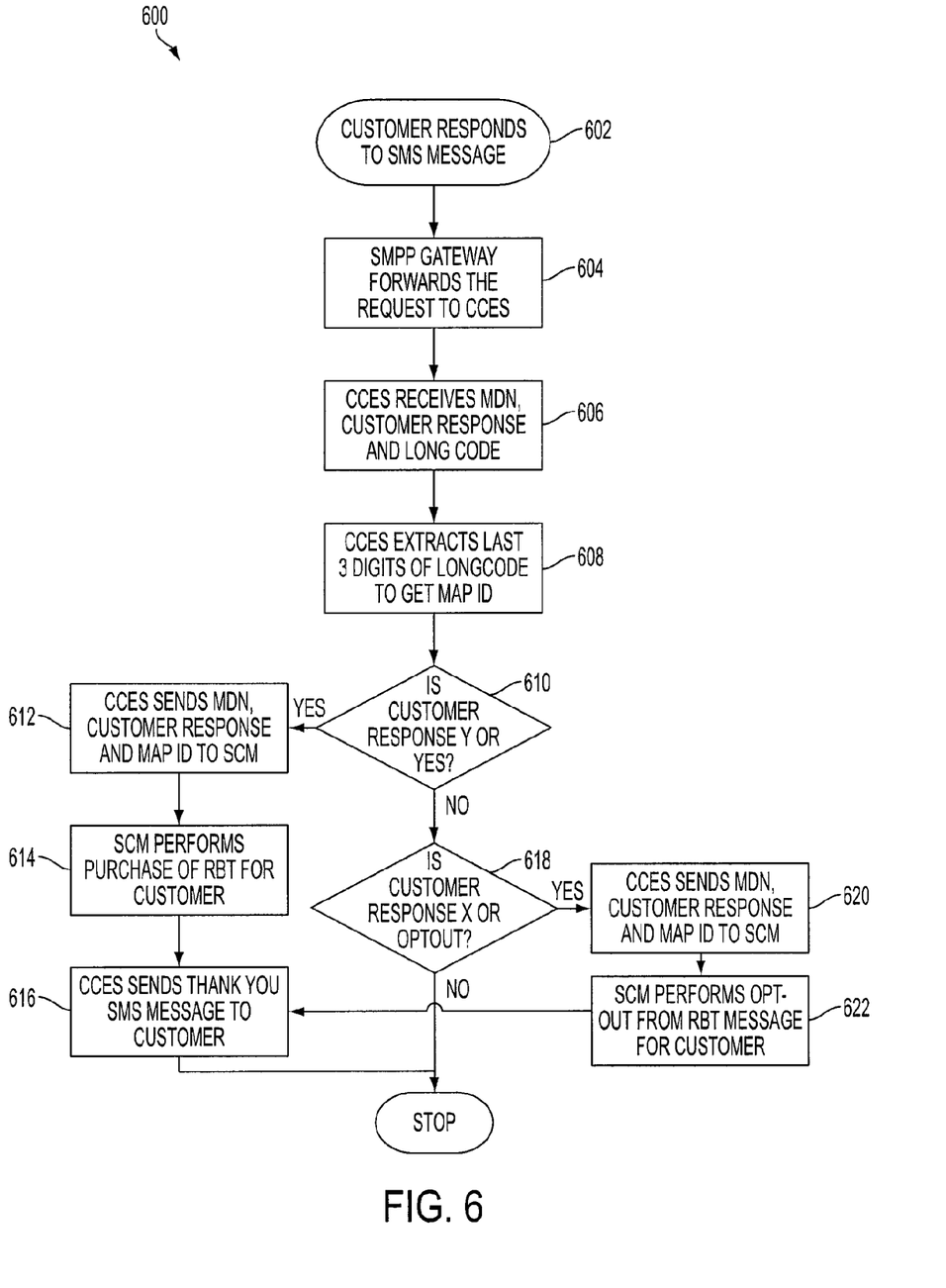
FIG. 6 illustrates an exemplary process showing the processing of the customer's response to the RBT purchase offer.

FIG. 6 illustrates an exemplary process 600 showing the processing of the customer's response to the RBT purchase offer. The process 600 begins with the customer responding to the RBT purchase offer (602). The customer receives the purchase offer and selects to either purchase the RBT or to opt out from receiving future RBT purchase offers. The customer may either reply with "Y" or "Yes" to purchase the RBT or with "X" or "Optout" to opt out from receiving future RBT purchase offers.

The messaging gateway forwards the customer's response to CCES 411 (604). The CCES 411 receives the customer reply message and extracts therefrom the MDN, customer response (e.g., "Y" or "X") and the long code (606). The CCES 411 extracts the last three digits of the long code to identify the mapping identification code (608). The CCES 411 then determines whether the customer's response is "Y" or "Yes" (610). If so (610, yes), CCES 411 sends the MDN, customer response and the mapping identification code to SCM 409 (612). The SCM 409 receives the MDN, customer response and the mapping identification code and identifies the RBT content identification code associated with the mapping identification code. Upon identifying the RBT content identification code, SCM 409 performs purchase of RBT for the customer (614). Thereafter, SCM 409 requests that the CCES 409 send a thank you SMS to the customer. The CCES 409 receives the request and sends a thank you SMS to the customer (616).

In a slightly different implementation, as noted above with respect to FIG. 4, SCM 409 may request that CCES 411 first confirms the customer's selection before purchasing the RBT for the customer. For example, SCM 409 may request that CCES 411 sends a confirmation SMS to the customer asking the customer to confirm the purchase of the RBT. Only after receiving the customer confirmation, SCM 409 purchases the RBT for the customer.

Moving forward, if the customer's response is not "Y" or "Yes" (610, no), CCES 411 checks to see if the customer response is "X" or "Optout" (618). If not (618, no), the process 600 stops. If yes (618, yes), CCES 411 sends the MDN, the customer response and the mapping identification code to SCM 409 (620). The SCM 409 opts the customer out from receiving RBT messages in the future (622) and instructs CCES 411 to send a thank you SMS to the customer.

Figure 7:
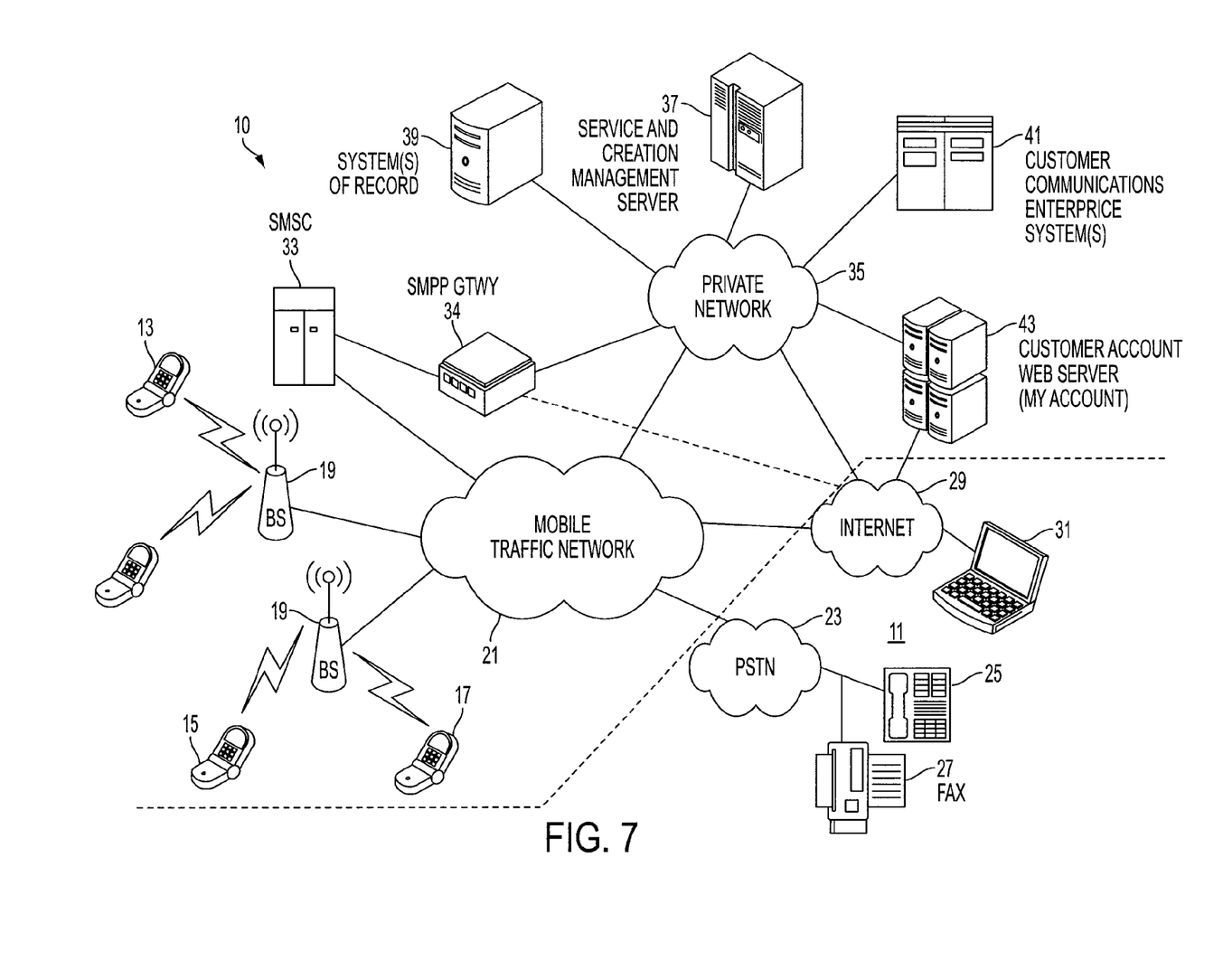
FIG. 7 illustrates a number of mobile devices, a mobile communication network coupled to other communication networks and several systems/elements associated with or included in the mobile network for various functions such as, for example, selling RBT to mobile devices.

With this detailed explanation, reference now is made to a mobile communication network that makes the communications between mobile devices possible. FIG. 7 illustrates a number of mobile devices, a mobile communication network coupled to other communication networks and several systems/elements associated with or included in the mobile network for various functions such as, for example, selling RBT to mobile devices.

Hence, FIG. 7 illustrates a mobile communication network 10 as may be operated by a carrier or service provider to provide a wide range of mobile communication services and ancillary services or features to its subscriber customers and associated mobile device users. The elements generally indicated by the reference numeral 10 generally are elements of the network and are operated by or on behalf of the carrier, although the mobile devices typically are sold to the carrier's customers. The mobile communication network 10 provides communications between mobile devices as well as communications for the mobile devices with networks and devices 11 outside the mobile communication network 10.

For purposes of later discussion, several mobile devices appear in the drawing, to represent examples of the mobile devices that may receive various services via the mobile communication network 10. Today, mobile devices typically take the form portable handsets, smart-phones or personal digital assistants, although they may be implemented in other form factors.

The network 10 allows users of the mobile devices to initiate and receive telephone calls to each other as well as through the public switched telephone network ("PSTN") and telephone devices connected thereto. The network 10 allows SMS type text messaging between mobile devices and similar messaging with other devices via the Internet. The network 10 typically offers a variety of other data services via the Internet, such as downloads, web browsing, e-mail, etc. In one particular example, as noted above, the network 10 enables a user of mobile devices 13, 15, 17 to purchase RBT without having to manually enter the RBT content identification code, the artist name, and/or the song title.

The mobile communication network 10 typically is implemented by a number of interconnected networks. Hence, the overall network 10 may include a number of radio access networks ("RANs"), as well as regional ground networks interconnecting a number of RANs and a wide area network ("WAN") interconnecting the regional ground networks to core network elements, such as the MMSCs. A regional portion of the network 10, such as that serving mobile devices 13, 15 and 17, will typically include one or more RANs and a regional circuit and/or packet switched network and associated signaling network facilities.

Physical elements of a RAN operated by one of the mobile service providers or carriers, include a number of base stations represented in the example by the base stations ("BSs") 19. Although not separately shown, such a base station 19 typically comprises a base transceiver system ("BTS") which communicates via an antennae system at the site of base station and over the airlink with one or more of the mobile devices 13, 15 and 17, when the mobile devices are within range. Each base station typically includes a BTS coupled to several antennae mounted on a radio tower within a coverage area often referred to as a "cell." The BTS is the part of the radio network that sends and receives RF signals to/from the mobile devices that the base station currently serves.

The radio access networks also include a traffic network represented generally by the cloud at 21, which carries the user communications for the mobile devices 13, 15 and 17 between the base stations and other elements with or through which the mobile devices communicate. Individual elements such as switches and/or routers forming the traffic network 21 are omitted here form simplicity.

The MDN is the telephone number assigned to a mobile device, which a calling party or device inputs in order to call or send a message to the particular mobile device. To call the mobile device 15, for example, a user of a PSTN telephone or of another mobile device dials the MDN associated with the mobile device 15. To send a MMS message or a SMS message to destination mobile device 15, as another example, typically entails input of the MDN of that mobile device. A Mobile Identification Number ("MIN") is an identification number used by the network 10 to signal a particular mobile device. The MIN is formatted like a telephone number, and the MIN may be the same as the MDN. However, increasingly, the network assigns a different number for use as the MIN and translates the MDN input by a calling or other originating party into the MIN that the network 10 uses to establish the call or send the message to the destination mobile device. Of these numbers assigned to the mobile device, the MDN typically is the number or address of the device known and used by other parties or devices.

The traffic network portion 21 of the mobile communication network 10 connects to a public switched telephone network 23. This allows the network 10 to provide voice grade call connections between mobile devices and regular telephones connected to the PSTN 23. The drawing shows one such telephone at 25. For purposes of discussing notifications, some notifications may entail voice message delivery or even service representative calls to the account holder, for example, at a regular telephone such as telephone 25 via the PSTN 23. The PSTN 23 also provides connections to other types of customer premises equipment, such as facsimile or 'FAX' machines. The drawing shows one FAX machine 27, by way of example, to illustrate the point that an account holder notification may entail a facsimile transmission of the notification message to the account holder's FAX machine, such as the machine 27.

The traffic network portion 21 of the mobile communication network 10 connects to a public packet switched data communication network, such as the network commonly referred to as the "Internet" shown at 29. Packet switched communications via the traffic network 21 and the Internet 29 may support a variety of user services through the network 10, such as mobile device communications of text and multimedia messages, e-mail, web surfing or browsing, programming and media downloading, etc. For example, the mobile devices may be able to receive messages from and send messages to user terminal devices, such as personal computers, either directly (peer-to-peer) or via various servers (not separately shown). The drawing shows one such user terminal device as a personal computer ("PC") at 31, by way of example. For purposes of discussing notifications, some notifications may entail an e-mail message transmission of the notification to the account holder's terminal, such as to the PC 29 via the Internet 29.

Wireless carriers developed the SMS to transmit text messages for display on the mobile devices. In many existing network architectures, the SMS traffic uses the signaling portion of the network 21 to carry message traffic between a Short Message Service Center ("SMSC") 33 and the mobile devices. The SMSC supports mobile device to mobile device delivery of text messages. However, the SMSC also supports communication of messages between the mobile devices and devices coupled to other networks. For example, the SMSC 33 may receive incoming IP message packets from the Internet 29 for delivery via the network 21, one of the base stations 19 and a signaling channel over the air link to a destination mobile device. For this later type of SMS related communications, the network 10 also includes one or more Short Message Peer-to-Peer ("SMPP") protocol gateways 34. The SMPP gateway provides protocol conversions, between SMPP as used by the SMSC 33 and the protocols used on the Internet 29 or other IP network. SMPP messages ride on IP transport, e.g. between the gateway 34 and the SMSC 33.

Of note for purposes of this discussion, many of the notifications discussed herein are sent to various mobile devices using SMS capabilities of the network 10. For example, when a user of mobile device 17 makes a call to a user of mobile device 13, the calling customer listens to the RBT played by the called customer. The network 10 will capture the RBT played and will provide the user of mobile device 17 with an SMS purchase offer via SMSC 33, the traffic network 21, one of the base stations 19.

The SMS purchase offer may be generated as a result of collaboration of several ancillary support elements associated with the network 10. These support elements communicate with other nodes/elements of the network 10 via one or more private IP type packet data networks 35 (sometimes referred to as an Intranet). The support elements include, for example, the SCM 37 and the CCES 41.

In keeping with the previous example, SCM 37 receives the CDR associated with the RBT heard by the user of the mobile device 17 and creates a mapping table between the RBT content identification codes and mapping identification codes. Once the mapping is accomplished, SCM 37 requests from CCES 41 that an SMS message be forwarded to mobile device 17 offering the user of mobile device 17 an option to purchase the RBT. The message includes the mapping identification code associated with the RBT content identification code as a part of a reply-to-number.

As noted above, the exemplary network 10 also includes CCES 41, which is coupled for communication via the private network 35. In keeping with the previous example, the SMS request is received by CCES 41. Along with the request, CCES 41 may also receive the MDN associated with mobile device 17 and a mapping identification code associated with the RBT content identification code. The CCES 41 generates a long code for the mapping identification code. In one implementation, the long code includes the mapping identification code as its least three significant digits. The CCES 41 then generates a message with the long code as a reply-to-number and forwards the message to the mobile device 17 via SMSC 33. The message identifies the artist name and song title associated with the RBT heard by the user of mobile device 17 and offers the user of mobile device 17 an option to purchase the RBT.

The CCES 41 receives a reply SMS from the user of mobile device 17 indicating, for example, that the user desires to purchase the RBT. The CCES 41 identifies the mapping identification code from the reply to number and forwards the mapping identification code along with the user's response to purchase the message to SCM 37. The SCM 37 receives the response along with the mapping identification code and identifies from the mapping identification code the RBT content identification code using. The SCM 37 then sells the RBT associated with the RBT content identification code to the user.

Another network support elements, for example, include one or more systems of record, such as the system shown at 39. An example of such a system 39 is a Vision system, which includes subscriber account records. A large carrier typically has a number of such systems, and the system that stores the account data for a particular subscriber may be referred to as the "system of record" for that subscriber's account.

In practice today, the carrier will also offer its subscribers on-line access to a variety of functions related to the subscribers' accounts, such as review of billing statements and usage data, on-line payment, subscription changes, password control or the like. For that purpose, the carrier in our example operates a customer account web server 43, offering a 'MyAccount' (Now MyVerizon) type subscriber interface via the Internet. Hence, a user's terminal, such as PC 31, may be used to access on-line information about a subscriber's account, which the mobile carrier makes available via the carrier's MyAccount web site accessible through the Internet 29. Of note for purposes of the present discussions of notifications, the web site provides secure user access to the RBT feature setting and allows the subscriber to, for example, opt out from receiving RBT purchase offers for mobile device 17. Once the subscriber has opted out from the RBT tagging messages, he can reactivate to receive these messages at anytime in the future by logging into subscriber's account and making changes thereto. For example, the subscriber may use the PC 31 to log-in via the site offered by the server 43 to subscribe to RBT purchase offers. The server 43 communicates with other network systems via the private network 35, for example, to store the subscription information and account holder designation in the systems of record 39 and 53.

Figure 8:
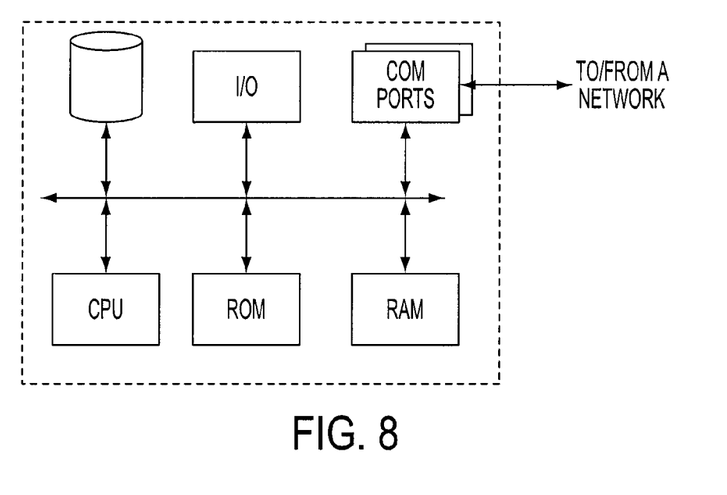
FIG. 8 illustrates a network or host computer platform, as may typically be used to implement a server.
Figure 9:
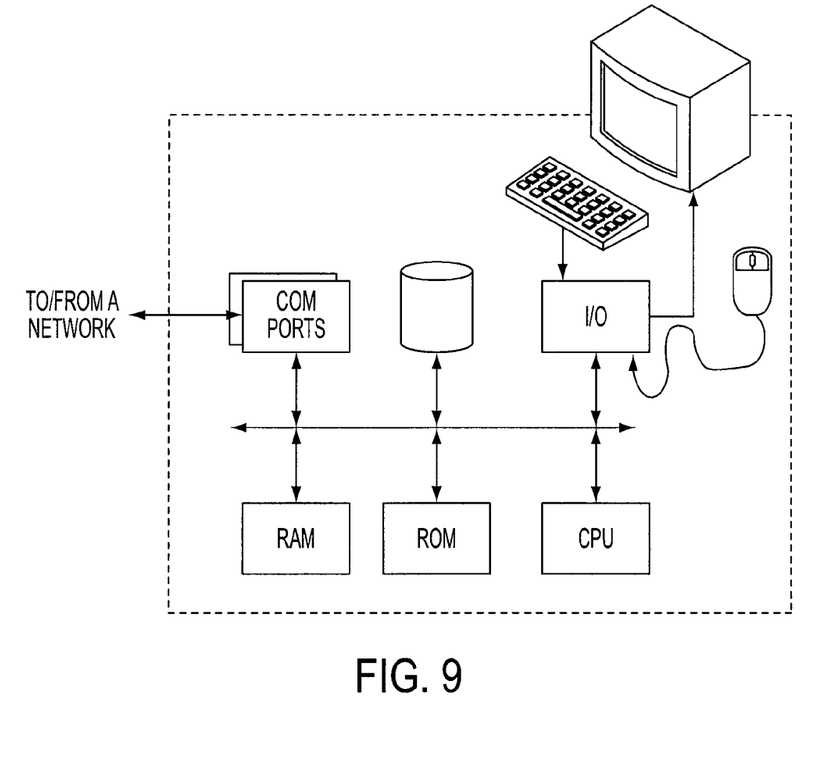
FIG. 9 illustrates a computer with user interface elements, as may be used to implement a personal computer (PC) or other type of work station or terminal device.

FIGS. 8 and 9 provide functional block diagram illustrations of general purpose computer hardware platforms. FIG. 8 illustrates a network or host computer platform, as may typically be used to implement a server. FIG. 9 depicts a computer with user interface elements, as may be used to implement a personal computer (PC) or other type of work station or terminal device, although the computer of FIG. 9 may also act as a server if appropriately programmed.

The server functions may be implemented in a distributed fashion on a number of similar platforms, to distribute the processing load.

Hence, aspects of the methods for enabling a user of a mobile device to purchase RBT outlined above may be embodied in programming. Program aspects of the technology may be thought of as "products" or "articles of manufacture" typically in the form of executable code and/or associated data that is carried on or embodied in a type of machine readable medium. "Storage" type media include any or all of the memory of the computers, processors or the like, or associated modules thereof, such as various semiconductor memories, tape drives, disk drives and the like, which may provide storage at any time for the software programming. All or portions of the software may at times be communicated through the Internet or various other telecommunication networks. Such communications, for example, may enable loading of the software from one computer or processor into another, for example, from a management server or host computer of the network operator or carrier into the computer platform of the data aggregator and/or the computer platform (s) that serve as the customer communication system. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the data aggregator, the customer communication system, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media can take the form of electric or electromagnetic signals, or acoustic or light waves such as those generated during radio frequency ("RF") and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

The present teachings are amenable to a variety of modifications and/or enhancements. For example, although the implementations described above utilized SMS type messages as the initial notification messages to the party that committed the infraction and to the account holder, other electronic messages to their mobile stations may be used for those notifications, such as MMS type messages.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

What is claimed is:

1. A method comprising steps of:
generating and sending, to a mobile device, an offer message offering for purchase a Ring Back Tone ("RBT") and including a reply-to telephone number;
in response to the offer message, receiving a reply message sent from the mobile device to the reply-to telephone number of the offer message;
extracting a code from the reply-to telephone number to which the received reply message was sent;
identifying, in a table storing a plurality of codes each associated with a corresponding RBT, a particular RBT associated with the code extracted from the telephone number; and
determining that a user of the mobile device desires to purchase the particular RBT associated with the code in the table, based on the identifying step.

2. The method of claim 1, further comprising:
retrieving, from a calling data record (CDR), identification of the mobile device,
wherein the CDR identifies the mobile device as having originated a call and includes identification of the RBT played during the call; and
generating and storing, in the table storing the plurality of codes each associated with a corresponding RBT, a new code associated with the RBT identified in the CDR,
wherein the generating and sending of the offer message includes generating an offer message including the new code as part of the reply-to-number of the offer message, and sending the offer message to the mobile device identified in the CDR as having originated the call.

3. The method of claim 2, further comprising:
determining whether the mobile device identified in the CDR as having originated the call has opted out of a service providing purchase offers,
wherein the steps of generating and storing, generating and sending, receiving, extracting, identifying, and determining are performed in response to determining that the mobile device has not opted out of the service.

4. The method of claim 2, further comprising:
determining whether the mobile device identified in the CDR has previously purchased the RBT identified in the CDR,
wherein the steps of generating and storing, generating and sending, receiving, extracting, identifying, and determining are performed in response to determining that the mobile device has not previously purchased the RBT.

5. The method of claim 1, further comprising steps of:
in response to determining that the user desires to purchase the particular RBT, determining whether the user has reached a threshold number of RBTs; and
sending a notification message to the mobile device of the user indicating that the threshold number of RBTs has been reached.

6. The method of claim 5, wherein the threshold number of RBTs corresponds to a maximum number of RBTs that the user can purchase.

7. The method of claim 6, further comprising a step of:
receiving a selection from the user to remove one or more purchased RBTs associated with an account of the user; and
removing the selected one or more purchased RBTs from the account of the user in response to receiving the selection.

8. The method of claim 1, further comprising a step of:
extracting from the received reply message a source telephone number associated with the mobile device from which the reply message was sent.

9. The method of claim 1, wherein the reply-to telephone number is a long code including the code stored in the table and associated with the corresponding RBT.

10. The method of claim 1, wherein the reply message is a mobile text message.

11. A system comprising:
a processing device;
a memory storing a table storing a plurality of codes each associated with a corresponding RBT; and
a non-transitory storage medium storing executable instructions for causing the processing device to perform functions including functions to:
generate and send, to a mobile device, an offer message offering for purchase a Ring Back Tone ("RBT") and including a reply-to telephone number;
in response to the offer message, receive a reply message sent from the mobile device to the reply-to telephone number of the offer message;

extract a code from the reply-to telephone number to which the received reply message was sent;

identify, in the table storing a plurality of codes each associated with a corresponding RBT, a particular RBT associated with the code extracted from the telephone number; and determine that a user of the mobile device desires to purchase the particular RBT associated with the code in the table, based on the identifying function.

12. The system of claim 11, wherein the non-transitory storage medium stores further executable instructions for causing the processing device to perform functions to:

retrieve, from a calling data record (CDR), identification of the mobile device, wherein the CDR identifies the mobile device as having originated a call and includes identification of the RBT played during the call; and generate and store, in the table storing the plurality of codes each associated with a corresponding RBT, a new code associated with the RBT identified in the CDR, wherein the function to generate and send the offer message includes a function to generate an offer message including the new code as part of the reply-to-number of the offer message, and send the offer message to the mobile device identified in the CDR as having originated the call.

13. The system of claim 12, wherein the non-transitory storage medium stores further executable instructions for causing the processing device to perform a function to:

determine whether the mobile device identified in the CDR as having originated the call has opted out of a service providing purchase offers, wherein the functions to generate and store, generate and send, receive, extract, identify, and determine are performed in response to determining that the mobile device has not opted out of the service.

14. The system of claim 12, wherein the non-transitory storage medium stores further executable instructions for causing the processing device to perform a function to:

determine whether the mobile device identified in the CDR has previously purchased the RBT identified in the CDR, wherein the functions to generate and store, generate and send, receive, extract, identify, and determine are performed in response to determining that the mobile device has not previously purchased the RBT.

15. The system of claim 11, wherein the non-transitory storage medium stores executable instructions for causing the processing device to perform further functions to:

in response to determining that the user desires to purchase the particular RBT, determine whether the user has reached a threshold number of RBTs; and send a notification message to the mobile device of the user indicating that the threshold number of RBTs has been reached.

16. The system of claim 15, wherein the threshold number of RBTs corresponds to a maximum number of RBTs that the user can purchase.

17. The system of claim 16, wherein the non-transitory storage medium stores executable instructions for causing the processing device to perform further functions to:

receive a selection from the user to remove one or more purchased RBTs associated with an account of the user; and remove the selected one or more purchased RBTs from the account of the user in response to receiving the selection.

18. The system of claim 11, wherein the non-transitory storage medium stores executable instructions for causing the processing device to perform further functions to:

extract from the received reply message a source telephone number associated with the mobile device from which the reply message was sent.

19. The system of claim 11, wherein the reply-to telephone number is a long code including the code stored in the table and associated with the corresponding RBT.

20. The system of claim 11, wherein the reply message is a text message.

21. A method comprising steps of:

generating and sending, to a mobile device, an offer message offering for purchase a media file and including a reply-to telephone number;

in response to the offer message, receiving a reply message sent from the mobile device to the reply-to telephone number of the offer message;

extracting a code from the reply-to telephone number to which the received reply message was sent;

identifying, in a table storing a plurality of codes each associated with a corresponding media file, a particular media file associated with the code extracted from the telephone number; and determining that a user of the mobile device desires to purchase the particular media file associated with the code in the table, based on the identifying step.

* * * * *